April 27, 1965 L. E. HARPER ETAL 3,180,526
POSITIVELY DRIVEN WEIGH BELT FOR CONTINUOUS WEIGHING MEANS
Filed March 8, 1962 7 Sheets-Sheet 1
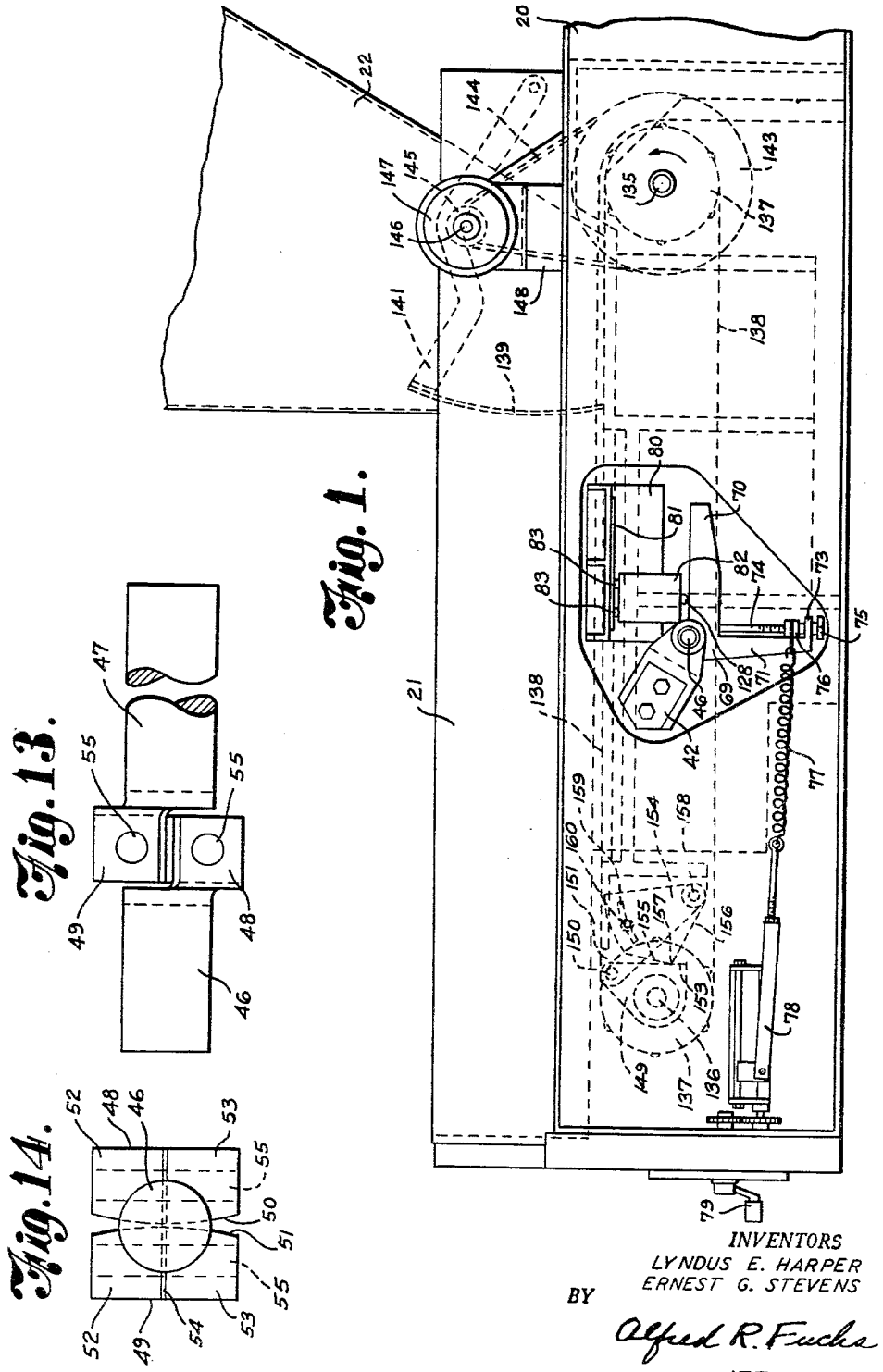
INVENTORS
LYNDUS E. HARPER
ERNEST G. STEVENS
BY
Alfred R. Fuchs
ATTORNEY

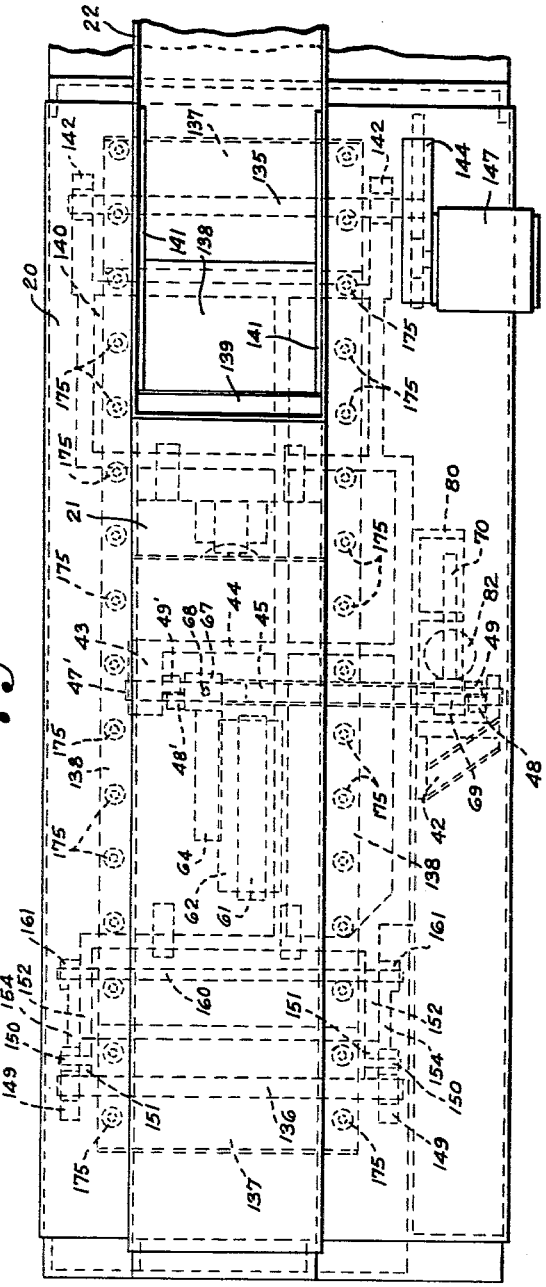

April 27, 1965

L. E. HARPER ETAL 3,180,526

POSITIVELY DRIVEN WEIGH BELT FOR CONTINUOUS WEIGHING MEANS

Filed March 8, 1962

INVENTORS
LYNDUS E. HARPER
ERNEST G. STEVENS

BY

Alfred R. Fuchs

ATTORNEY

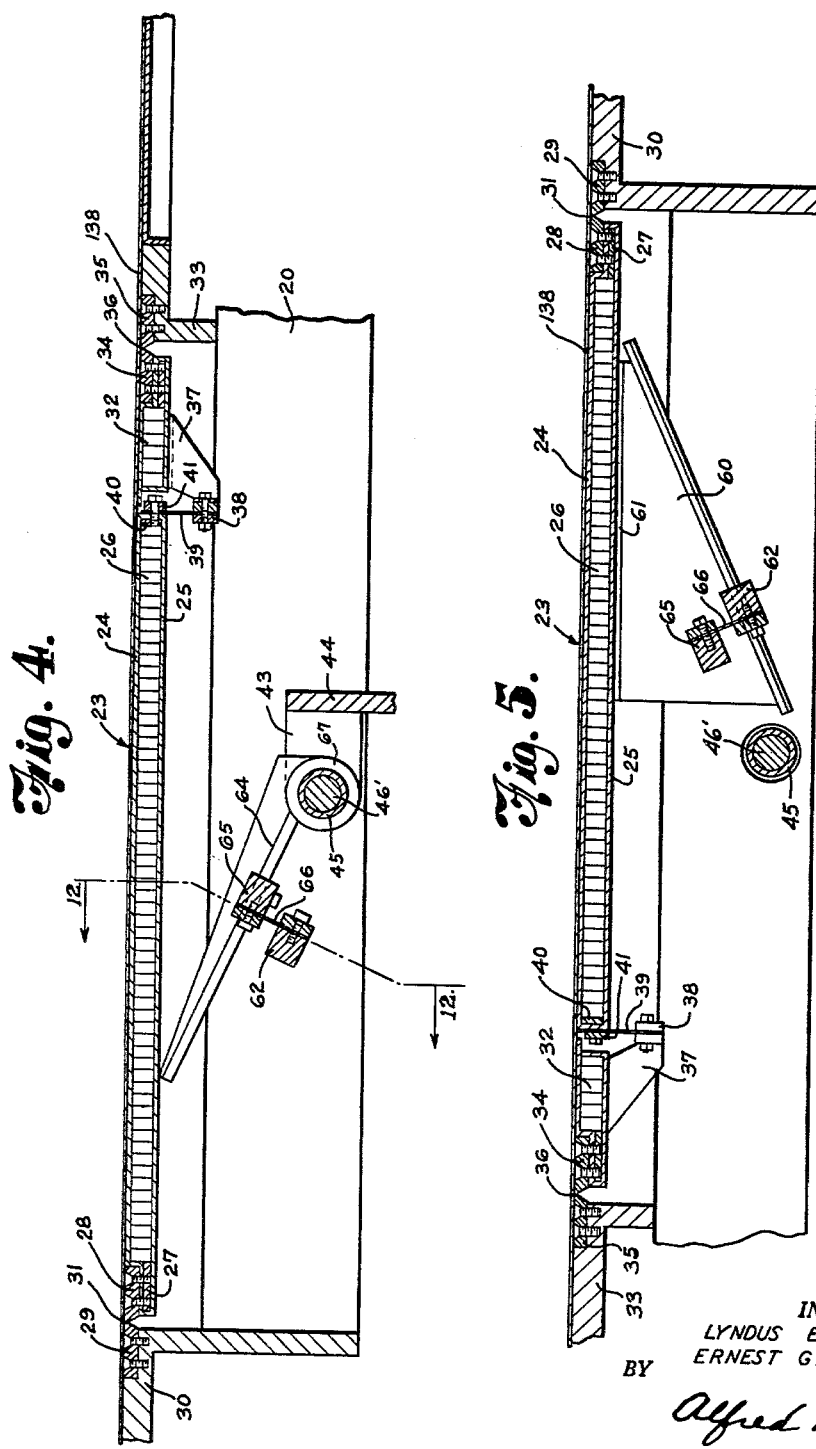

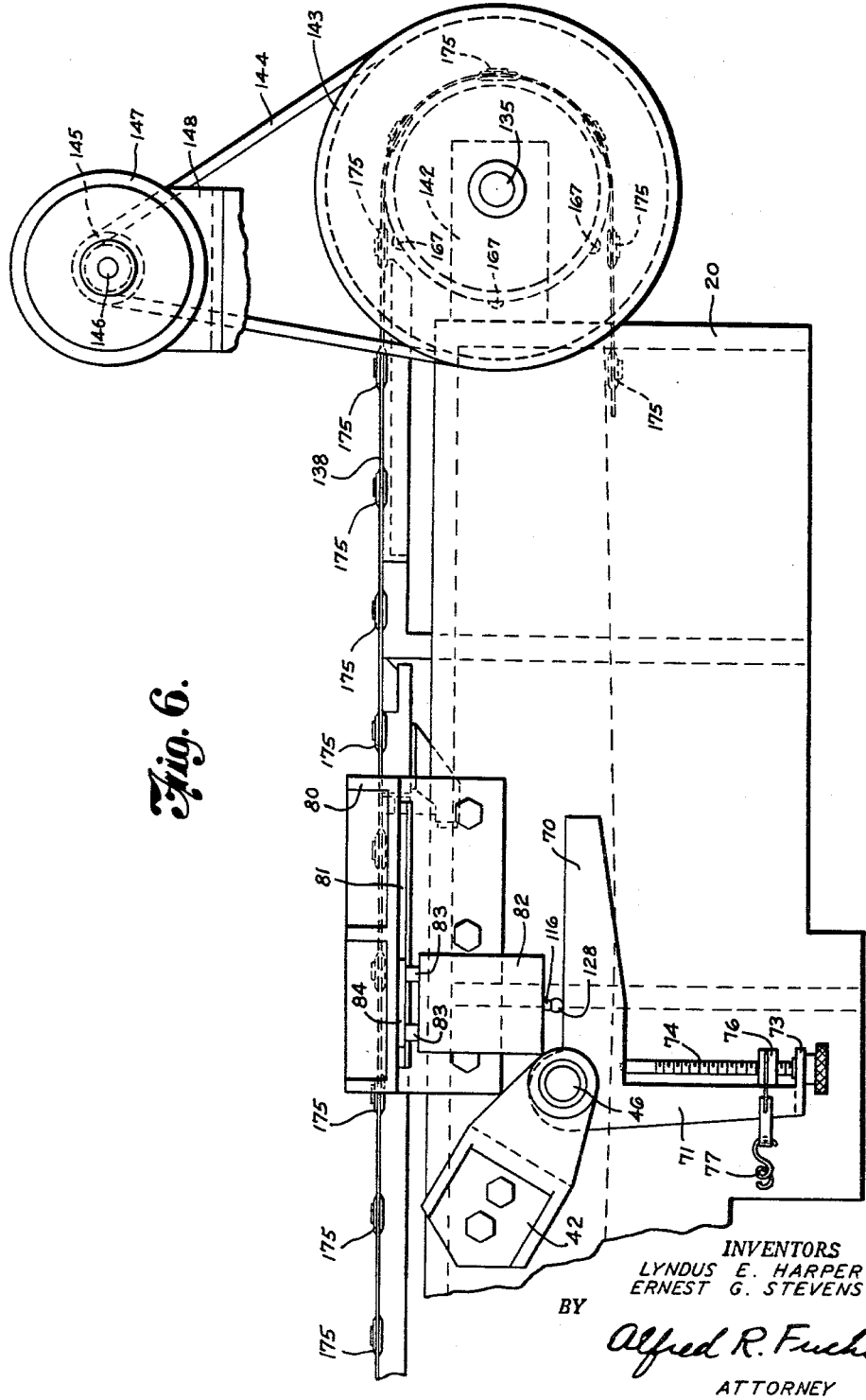

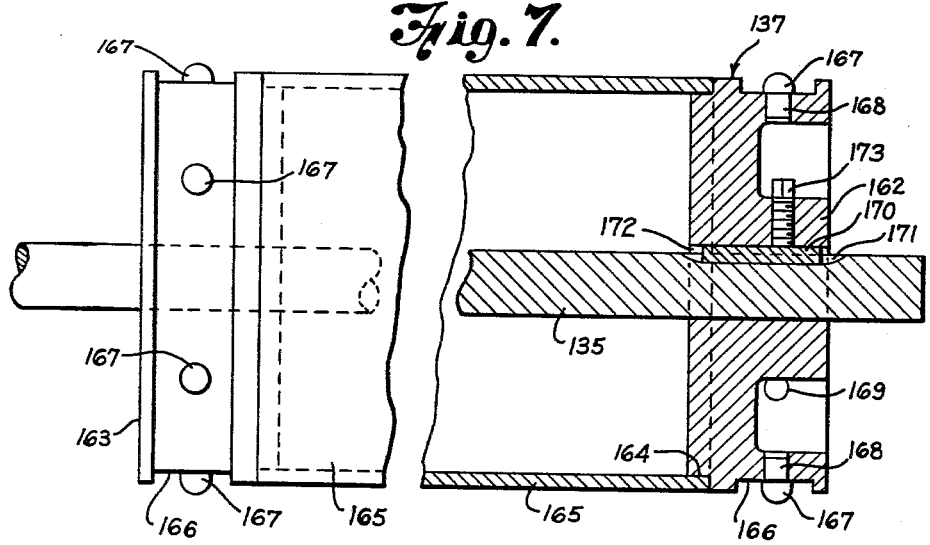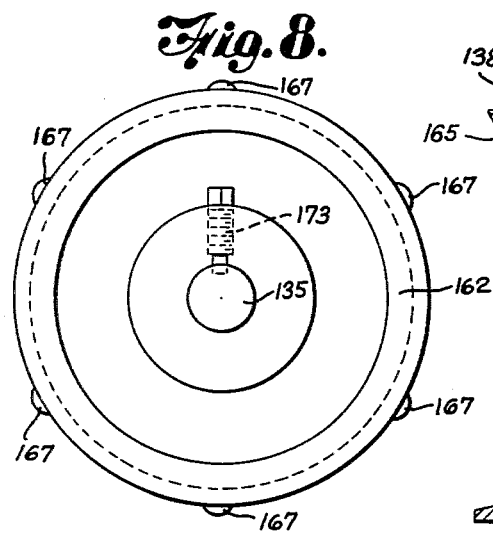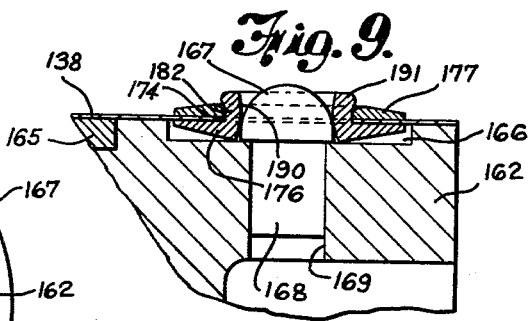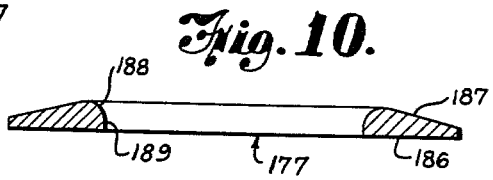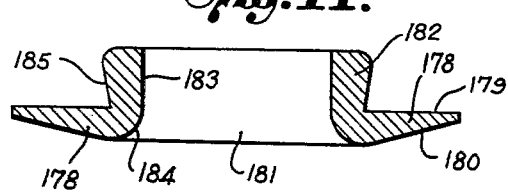

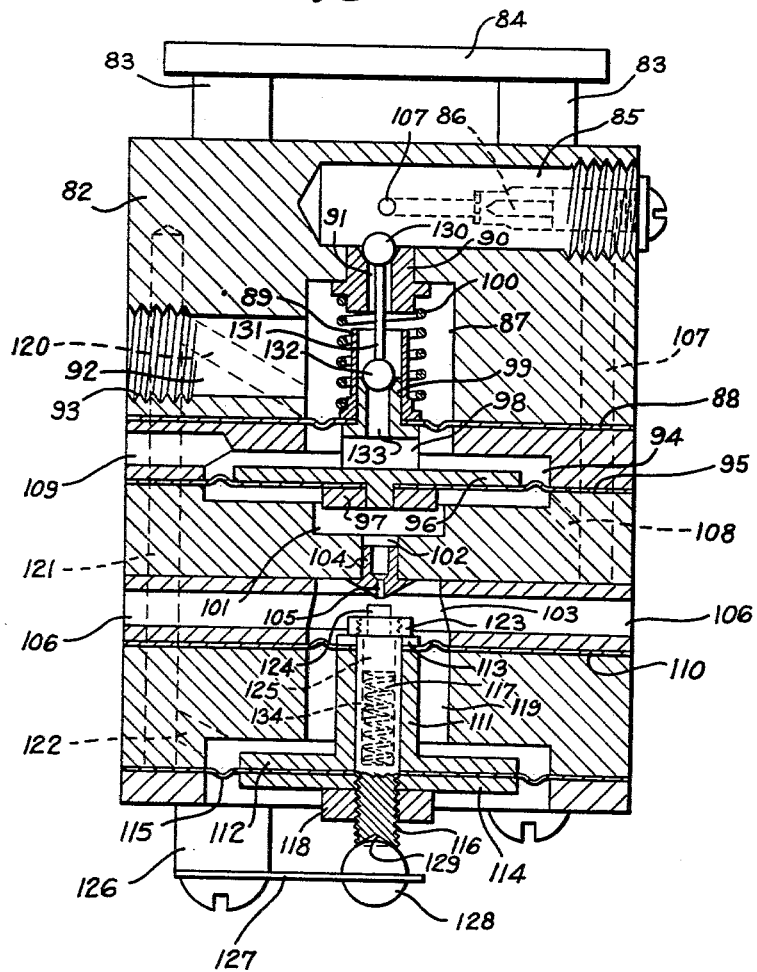

United States Patent Office 3,180,526
Patented Apr. 27, 1965

3,180,526
POSITIVELY DRIVEN WEIGH BELT FOR CONTINUOUS WEIGHING MEANS
Lyndus E. Harper, West Barrington, and Ernest G. Stevens, Johnston, R.I., assignors to The New York Air Brake Company, a corporation of New Jersey
Filed Mar. 8, 1962, Ser. No. 178,302
13 Claims. (Cl. 222—55)

Our invention relates to continuous weighing devices, and more particularly to a continuous weighing device having a positively driven weighing belt.

In order to obtain accurate weighing of material by means of a continuous weighing device that includes a weighing belt and a weighing platform over which the upper run of the belt slides, it is highly desirable that both the belt and the weighing platform be light in weight and yet have the necessary strength to carry the load that is imposed thereon. It has been found that certain materials are capable of being made up in the form of belts that can be of considerable width, but very thin, provided that the belt is not driven by friction, which requires that the belt be stretched tight between the spaced conveyor rollers. A disadvantage of material that requires a frictional grip thereon to drive the same, is that certain materials will tend to cling thereto at the discharge end of the weighing belt. By the use of materials that have relatively slick surfaces, this difficulty is avoided, but the driving of such a weighing belt involves difficulties which the applicants have solved by providing a positive drive between at least one of the conveyor rollers and the weighing belt.

By providing a positive drive between the belt and rollers, no slip of a slick surface belt will result, and the positive driving means will keep the belt in proper alignment with the conveyor rollers at all times.

More accurate weighing can be obtained by means of a weighing belt if the load on the belt does not tension the belt to the extent that the tension tends to stretch the same. We have found, that by providing positive engaging means between the driving conveyor roller and the weighing belt, the upper run of the weighing belt onto which the material to be weighed is fed need not be under tension, but can be somewhat slack or relaxed, thus eliminating any stretching forces from in any way interfering with the accurate weighing of the material that is fed onto the belt and passes across the weighing platform. By not having the weighing belt under tension, the life of the weighing belt is also extended.

More specifically our invention comprises a weighing belt the upper run of which operates over a weighing platform, and a pair of spaced rollers, which belt and at least the driving roller have interengaging means thereon providing a positive driving connection between the belt and the roller, said driving connection being obtained by providing openings uniformly spaced longitudinally of the belt cooperating with uniformly circumferentially spaced projections on the roller engaging in said openings.

Inasmuch as it is particularly desirable to utilize our invention in connection with extremely thin weighing belts, the openings in the weighing belt, that are provided in the marginal portions thereof, are provided with reinforcing means in the form of grommets that are provided for each of said openings, with which the projecting means on the rollers engage.

In order that the weighing belt can be made exceedingly thin and light, it is desirable to make the weighing belt of flexible sheet material that is of great strength for its thickness, and which may be either a woven fabric or a film. Among the films that are of sufficient strength and flexibility that the same can be used for our improved weighing belt are polyester and urethane films.

Our invention has been successfully applied to a weighing belt that is made of polyester film, which is only .003 of an inch thick and which operates over rollers that have their axes spaced only 33 inches apart and which belt is over 24 inches wide. Such a short, wide weighing belt is difficult to drive in a straight path without the use of the positive driving means that we provide.

In order to keep the weight of the apparatus that transfers the weight of the material to the scale mechanism at a minimum, it is not only desirable that the weighing belt or material conveyor be kept thin, but that the weighing platform be made as light as possible and yet have sufficient strength to support the load imposed thereon. In our improved weighing apparatus, we accordingly provide a weighing platform that is provided with a flat topped plate over which the upper run of the weighing belt slides, that is provided with a reinforcing grid for strengthening the same so that the entire weighing platform can be made as light as possible with maximum strength.

Our weighing apparatus, in the embodiment shown and described, is preferably provided with a conveyor belt of a plastic film that is provided with uniformly spaced rows of openings along the marginal edges thereof, each of the openings having a grommet secured therein so as to reinforce said openings, said grommets being preferably made of a pair of plastic members that have the material of the belt gripped between the same, which plastic members may be slightly flexible so that the grommets can flex slightly in passing around the conveyor rollers, and in which the conveyor rollers over which the weighing belt passes are provided with a central main body portion that is cylindrical, with which the belt engages face to face, and end portions that are grooved and are provided with uniformly circumferentially spaced projections in said grooves, the spacing of said projections being the same as that of the openings in the grommets to thus provide the positive driving connection between the conveyor rollers and the weighing belt. In order that the meshing of the projections on the conveyor roller with the grommets with respect to the driving projections, will be smooth and to assure the proper centering of the grommets said driving projections are preferably provided with spheroidal head portions that engage in openings in the grommets that flare slightly toward their lower ends.

Other objects and advantages of our invention will appear as the description of the drawings proceeds. We desire to have it understood, however, that we do not intend to limit ourselves to the particular details shown or described, except as defined by the claims.

In the drawings:

FIG. 1 is a slide elevational view of a feeder to which our improved weighing means is applied, portions thereof being broken away.

FIG. 2 is a plan view partly broken away, of the feeder shown in FIG. 1.

FIG. 3 is a plan view of a portion of the weighing apparatus partly broken away and on a larger scale than FIG. 2.

FIG. 4 is a longitudinal sectional view partly broken away, taken on the line 4—4 of FIG. 3.

FIG. 5 is a similar view taken on the line 5—5 of FIG. 3.

FIG. 6 is a view in side elevation of a portion of the weighing apparatus, showing the driven end of the weighing belt.

FIG. 7 is a view partly in longitudinal section and partly in elevation, partly broken away, of one of the weighing belt conveyor rollers.

FIG. 8 is an end elevation thereof.

FIG. 9 is a fragmentary detail view showing the interengaging grommet and projection on the weighing belt and conveyor roller.

FIG. 10 is a transverse sectional view through the locking ring of the grommet.

FIG. 11 is a similar view of the main body portion of the grommet.

FIG. 12 is a fragmentary sectional view taken substantially on the line 12—12 of FIG. 4.

FIG. 13 is a side elevational view of a torsion tube mounting member.

FIG. 14 is an end elevation thereof.

FIG. 15 is a detail view partly in vertical section and partly in elevation of the adjustable mounting for the load cell, and FIG. 16 is a vertical sectional view through the load cell on an enlarged scale.

Referring in detail to the drawings, in FIGS. 1 to 6 the weighing mechanism is shown as being provided in a feeder that is provided with a frame 20, upon which a housing 21 is mounted, as well as a hopper 22, the lower end portion of which is shown in FIG. 1. Mounted for movement responsive to weight with respect to the frame 20 is a weighing platform 23. Referring to FIG. 12 the weighing platform comprises an upper plate 24 and a lower plate 25, between which a grid 26 is provided for stiffening the structure. Upon reference to FIGS. 4 and 5 it will be noted that the bottom plate 25 is provided with a reinforcing bar 27, to which is secured a thickened mounting portion 28 of a flexure, which has the mounting portion 29 that is secured to a portion 30 of the frame 20, and which has a reduced portion 31 that is extremely thin, and inasmuch as the member made up of the parts 28, 29 and 31 is made of highly resilient steel, the connection 31 between the portions 28 and 29 of said mounting member will flex in accordance with the weight imposed upon the platform. As shown in FIG. 3, a pair of such flexures is provided connecting the weighing platform 23 with the frame 20 at one end thereof.

At the other end said weighing platform 23 is connected with a supplemental platform 32, which is of a similar character to the weighing platform 23, and which is mounted on the portion 33 of the frame 20 by means of flexures, similar to those previously described, comprising the securing portions 34 and 35 and the reduced flexible portion 36, a pair of said flexures being provided, as shown in FIG. 3. Said supplemental platform portion 32 is provided with brackets 37 extending obliquely downwardly therefrom, which are provided at their extremities with clamping means 38 for resilient steel strips 39, which are clamped at their upper ends to the end marginal wall 40 of the weighing platform 23 by suitable clamping means 41. The weighing platform is thus flexibly supported by means of the members 39 and the portions 31 of the flexures on the frame 20 so that the weighing platform 23 will move downwardly in proportion to the weight imposed thereon.

Brackets 42 and 43 are provided on the frame 20, the bracket 43 extending from a transverse frame member 44. The brackets are provided for mounting a torque tube 45. The mounting means for the torque tube includes the mounting member shown in FIGS. 13 and 14, which comprises stub shafts 46 and 47, which are provided with brackets 48 and 49, that are provided with convex surfaces 50 and 51 facing each other. Each of said brackets is made up of a pair of members 52 and 53, between which is mounted a thin resilient steel plate 54, said plate extending across the gap between the two brackets 48 and 49, as will be obvious from FIG. 14. The parts are held together by suitable fastening elements 55.

In FIGS. 2 and 3 the stub shaft 46 of the one mounting member is shown as being fixed in a suitable opening in the bracket 42 by means of a pin 56 and the other stub shaft 47 of said mounting member is shown as being secured in fixed position on the torque tube 45 by means of the pin 57. A mounting member similar to that shown in FIGS. 13 and 14 connects the tubular member 45 with the bracket 43, having a stub shaft 46′ secured to said bracket 43 by means of a pin 58 and a stub shaft 47′ connected with the tubular member 45 by means of the pin 59. The stub shaft 47′ is considerably longer than the shaft 46′ for a purpose to be described below, and has a bracket 49′ thereon similar to the bracket 49, while the shaft 46′ has a bracket 48′ thereon similar to the bracket 48, said brackets having a spring steel plate similar to the plate 54 mounted thereon and extending across the gap between the brackets 48′ and 49′. The torque tube 45 is thus mounted on the frame so that is can be turned about its axis against the action of the spring plates 54.

Referring to FIG. 12, depending from the weighing platform 23 is a hollow longitudinally extending bracket 60, which is provided with top flanges 61 secured to the bottom plate 25. Mounted on said bracket for adjustment thereon lengthwise thereof is a clamping member 62, which is held in adjusted position by means of a set screw 63. The lever 64 is provided with a similar clamping member 65 and a thin resilient steel plate 66 is clamped by means of the clamping members 62 and 65 so as to connect the lever 64 with the bracket 60 by means of the resilient connection provided by the member 66. The movements of the weighing platform 23 will thus be transmitted to the lever 64 so that said lever 64 will swing about its axis proportionately to the movement of the weighing platform 23. Said lever 64 is mounted on the stub shaft 47′, said stub shaft 47′ being of such length as to extend through the hub portion 67 of the lever 64 and into the torque tube 45, as will be evident from FIGS. 2 and 3. The stub shaft 47′ is connected with the lever 64 by means of a pin 68 so as to turn with the oscillations of the level 64 about the axis of the torque tube 45.

Mounted between the bracket 49 on the stub shaft 47 and the torque tube 45 is an L-shaped lever 69, which has a substantially horizontally extending leg 70 and a substantially vertically extending leg 71. Said lever 69 is fixed to the stub shaft 47 by means of a pin 72 so that said lever 69 will oscillate about the axis of the torque tube 45 along with the rotational movements of the torque tube 45 and shaft 47. The arm 71 of the lever has an ear 73 thereon, which is threaded to receive a screw-threaded portion of a shaft 74, which may be adjusted by means of the hexagonal head portion 75, and which is provided with a clamp 76 forming securing means for one end of a coil spring 77 that is provided with means for adjusting the tension thereof, indicated generally by the numeral 78, operable by means of the hand lever 79. The spring and the adjusting means comprise means for controlling the movements of the lever 69 responsive to the movements of the weighing platform 23 and thus constitute scale adjusting means.

Mounted on the frame 20 is a bracket 80, which has a slideway or track 81, that is substantially T-shaped in cross section, provided thereon, shown more in detail in FIGS. 6 and 15. Mounted for adjustment slidably longitudinally of said track or guideway 81 is a load cell 82, which is provided with paired upstanding brackets 83 that have a pair of flat bars 84 mounted thereon that have inwardly extending end portions mounted to slide on the horizontal flanges of the track or guideway 81.

The load cell is shown more in detail in FIG. 16 and is provided with an inlet passage 85, to which air under pressure is supplied. A chamber 87 is provided in said load cell and the bottom of said chamber 87 is closed by means of a diaphragm 88. Clamped on the diaphragm 88 is a valve member 89, which is provided with a ball valve portion 130 that seats in a suitable seat in the valve seat member 90 that has a passage 91 therein that connects the inlet passage 85 with the chamber 87 upon the valve 130 leaving its seat. From the chamber 87 an outlet passage 92 leads to an outlet connection 93. Mounted below the chamber 87 is a chamber 94, provided with the diaphragm 95, which is clamped in position in any suitable manner, and said diaphragm carries the flat disk portion 96 and a disk 97 secured to the disk-like member 96 so that said members 96, 97 and diaphragm 95 will move together. The disk 96 has a connecting portion 98 extending between the valve seat member 99 and said disk 96. The valve seat member 99 is mounted in the valve body 89 to move therewith, the diaphragm 88 being clamped between said valve body 89 and valve seat member 99. A compression coil spring 100 is mounted between a shoulder on the valve seat 90 and a shoulder on the valve body 89.

The chamber 94 has a reduced extension 101 extending downwardly therefrom and from said reduced extension a passage 102 extends downwardly to a chamber 103. Mounted in the passage 102 is a valve body 104 provided with a bleed opening 105. Passages 106 lead to the outer air from the chamber 103. A passage 107 extends from the inlet passage 85 to a connecting passage 108 that leads into the space below the diaphragm 95 in the chamber 94. It will accordingly be seen that air under pressure will be supplied from the inlet passage 85 to the under side of the diaphragm 95, the flow being controlled by valve 86. The air pressure under the diaphragm 95 will hold the parts in the position shown in FIG. 16 against the action of the spring 100 due to the fact that the space above the diaphragm 95 is open to the atmosphere through the passage 109.

Mounted on a diaphragm 110 is the tubular portion 111 of a member that is provided with a disk-like portion 112, a spacer 113 engaging the opposite side of the diaphragm from the tubular member 111. Cooperating with the disk-like member 112 is a disk-like member 114, serving to clamp the diaphragm 115 between the members 112 and 114 by means of the threaded tubular end portion 116 of a valve body 117 and a nut 118. The chamber 119 between said diaphragms 110 and 115 is connected with the outlet passage 92 by means of the passages 120, 121 and 122. The other side of the diaphragm 115 is open to the atmosphere, as will be obvious from FIG. 16. The valve body 117 is threaded at its upper end and has a nut 123 engaging therewith to clamp the valve body to the member 111 and the diaphragm 110 between the end of member 111 and the spacer 113. A valve member 124 adapted to cooperate with the bleed opening 105 is mounted in the valve body 117, having a head 125 thereon engaging the nut 123 and urged toward the same by the spring 134.

Mounted on a bracket 126 is a spring finger 127 on which is fixed a ball-like member 128 entering the end of the tubular threaded stem 116 provided on the valve body 117. The position of the member 128 will determine the position of the valve member 124 with relation to the bleed opening 105, as the valve body 117 and the member 111 having the disk-like portion 112 will all move together with the diaphragm 115. It will be noted that these parts will be urged downwardly against the tension of the member 127 by the air under pressure supplied to the chamber 119 above the diaphragm 115, and that when the bleed passage 105 is open to the atmosphere the pressure in the chamber below the diaphragm 95 will be reduced, which will cause the valve body 89 to be moved downwardly into the position shown in FIG. 16. However, when the bleed opening 105 is closed by means of the valve member 124 the pressure in the chamber below the diaphragm 95 will build up, causing upward movement of the parts, unseating the valve 130 and opening the outlet passage 92 to the inlet passage 85.

The valve member 130 is connected by means of a stem 131 with a valve member 132, which engages a seat in the valve body 99. Said valve member 132 will become unseated if the parts mounted on the diaphragm 95 move downwardly from the position shown in FIG. 16, opening the outlet passage 92 to the atmosphere through the passage 133 which connects with the passage 109 leading into the diaphragm chamber 94. As the position of the member 99 is determined by the position of the diaphragm 95, the pressure will be in proportion to the upward movement of the valve 124 which, in turn, is determined by the position of the operating member 128.

Mounted on the shafts 135 and 136 are the conveyor rollers 137. The weighing belt 138 operates over said conveyor rollers. Said weighing belt 138 passes over the weighing platform 23, material to be weighed being fed onto the same from the hopper 22, said conveyor belt 138, in the form of the invention shown, forming the bottom of the hopper. A gate 139 is provided for controlling the rate of feed of the material from the hopper onto the belt 138. A suitable platform 140 is provided under the conveyor belt 138 under the hopper 22 and suitable operating means 141 is provided for the gate 139. Any suitable means for controlling the position of the operating means 141 and thus of the gate 139 may be provided, the position of said operating means being determined by the position of the weighing platform 23 and operation of the load cell 82. Such operating means can be of the character shown in the application of Lyndus E. Harper, Serial No. 134,331, filed August 28, 1961, now abandoned, the position of the operating means and of the gate being determined by the air pressure passing from the load cell exhaust passage 92 to a controlling member for a gate, such as shown in said application, Serial No. 134,331.

The shaft 135 is mounted in suitable bearings on extensions 142 of the frame 20 and the conveyor roller 137 mounted on said shaft is fixed thereto to rotate therewith. Also mounted on the shaft 135 to rotate therewith is a pulley 143, over which a belt 144 operates, said belt also passing around a pulley 145, which is mounted on the shaft 146 of a motor 147, said motor 147 being mounted on a suitable base 148 mounted on the frame 20.

The shaft 136 is mounted in bearings in a pair of plates 149, which are mounted on the pivot pins 150 on ears 151 provided on a frame 152. The plates 149 are provided with flat faces 153, with which the adjusting cams 154 engage, said cams 154 having surfaces 155 and 156 providing an angular corner 157 engaging the flat surface 153. The cams 154 are mounted on a shaft 158 that is mounted on the frame and are provided with arcuate slots 159 in which is mounted a cross pin 160 on the frame. The cross pin 160 is provided with clamping nuts 161 on the ends thereof, which are adapted to engage with the cams 154 to clamp them in adjusted position.

It will be obvious that the position of the cams 154 will determine the position of the plates 149 and of the shaft 136. Thus adjusting means is provided for the spacing of the shafts 135 and 136 from each other, which will determine the tension on the weighing belt 138. The adjustment is preferably such that the upper run of the weighing belt 138 will be slightly relaxed so that when the weighing platform descends under the weight of the material passing thereacross on the belt 138, the material of the weighing belt 138 will not be put under such tension to stretch the material of said belt.

Referring to FIG. 7, the conveyor roller 137 mounted on the drive shaft 135 is shown. Said conveyor roller has a pair of end members 162 and 163 provided thereon. Said end members are provided with shoulders 164 seating the cylindrical main body portion 165 of the conveyor roller, and are provided with circumferential grooves 116, that are provided with flat bottom walls and vertical side walls, in which the spheroidal heads 167 of studs 168 are mounted. Said studs 168 are mounted in fixed position in openings 169 in the members 162 and 163 with the spheroidal head portions 167 thereof in engagement with the flat bottom walls of the grooves 166. Suitable means may be provided for securing the roller 137 to the shaft 135 to rotate therewith, such as the key 170 mounted in a keyway 171 in the shaft 135, and in a keyway 172 in the end member 162, said key being held in position by means of a set screw 173.

Adjacent the longitudinal marginal edges of the weighing belt 138 are rows of openings 174, which are reinforced by means of grommets 175. Said openings and, consequently, the grommets 175, are spaced uniform distances apart along the length of the weighing belt 138, the spacing of said grommets and of said openings being such that the heads 167 of the studs 168 will mesh therewith in the manner shown in FIG. 9.

Each of said grommets is made up of a body portion 176 and a locking or clamping ring 177. The body portion 176 is provided with a flange 178 that has a flat top face 179 and an inclined bottom face 180 and with a central opening 181 that is adapted to receive the head 167 of a stud 168. The annular wall 182 surrounding the opening 181 is provided with a cylindrical inner face 183 connecting with the inclined bottom wall 180 of the flange 178 by means of a convex wall portion 184 and has a conical outer wall 185, which flares upwardly, as will be obvious from FIG. 11. The locking ring 177 is provided with a flat bottom wall 186 and an inclined top wall 187 so that said locking ring tapers toward the outer circumferential edge thereof and is provided with a convexly curved corner 188 leading into the central opening therein from the inclined wall 187 to the cylindrical wall 189 provided thereon.

Preferably the grommet is made of a plastic material, such as a synthetic resin, that is somewhat flexible. When the body portion 176 and locking ring 177 are assembled as shown in FIG. 9, the flat faces 179 and 186 thereof will firmly engage the material of the weighing belt 138 so as to tightly clamp the grommet to the weighing belt, the annular wall 182 having been first passed through the opening 174 and the clamping or locking ring 177 then forced into position over the annular wall 182 into the position shown in FIG. 9. The diameter of the portion 189 of the locking or clamping ring 177 being preferably slightly less than the outer diameter of the annular wall 182 at the base of the same where it connects with the flange 178, this will distort the annular wall 182 as shown in FIG. 9, causing the inner face of the annular wall 182 to become convex, as shown at 190 in FIG. 9, and the outer wall thereof to be projected slightly outwardly at 191 so as to firmly interlock the ring 177 with the body portion 176. By providing a convexly curved spheroidal head 167 on the stud 168, the spheroidal projections thus provided in the groove 166 in each of the end members 162 and 163 will engage with the convex surfaces 190 of the anular walls 182 of the grommets so that the projections on the rollers will move smoothly into engagement with the openings in the grommets. The body portion of the weighing belt 138 is preferably made of a plastic film, such as a polyester or urethane film, which will have the desired strength and toughness that it will not be stretched under operating conditions. Other suitable flexible sheet material can be used for the weighing belt and it may be made of a woven material, should this be found to be desirable.

By providing the positively driven weighing belt 138, the weighing belt can be kept somewhat slack and relaxed and can be made of a material that will have a slick surface so as to prevent clinging of the material that is being weighed after the belt has passed around the roller 137 mounted on the shaft 136 at the discharge end of the weighing apparatus, and is particularly adaptable for use in apparatus in which very accurate weighing is desired. The weighing belt can be made of a very thin material, as it need not be put under tension, and due to the fact that the belt does not have to be put under tension, it will have a longer life than a belt that is frictionally driven from a drive roller. Furthermore, noise is eliminated, such as results from chain driven belts, the apparatus is sanitary and the belt can be made of corrosion resistant material, as can also the grommets.

What we claim is:

1. In a material weighing apparatus, a weighing platform having a flat top face and a material conveyor comprising a pair of spaced rollers, a wide, thin, slick surfaced conveyor belt of non-metallic flexible material extending around said rollers and having a relaxed upper run extending across said flat top face of said weighing platform in sliding face to face engagement therewith and driving means for one of said rollers, said belt and said last mentioned roller having interengaging means thereon providing a positive driving connection between said belt and last mentioned roller.

2. In a material weighing apparatus, a weighing platform and a material conveyor comprising a pair of spaced rollers, a wide, thin conveyor belt extending around said rollers and having an upper run extending across said weighing platform and driving means for one of said rollers, said belt having a row of openings adjacent a marginal edge thereof, grommets reinforcing said openings, said openings being uniformly spaced longitudinally of said belt and uniformly spaced spheroidal projections on said rollers engaging in said grommets.

3. In a material weighing apparatus, a weighing platform and a material conveyor comprising a pair of spaced rollers, a wide, thin conveyor belt extending around said rollers and having an upper run extending across said weighing platform and driving means for one of said rollers, said belt having a row of openings adjacent each of the marginal edges thereof uniformly spaced longitudinally of said belt, grommets reinforcing said openings, said grommets having tubular portions having convexly curved flaring bottom entrances, and uniformly spaced spheroidal projections on one of said rollers adjacent the opposite ends thereof engaging in said grommets by entrance into said tubular portions from the bottom thereof.

4. In a continuous weighing device, a pair of spaced conveyor rollers, a weighing platform mounted between said rollers, a weighing belt extending around said rollers and having the upper run thereof extending over said weighing platform, driving means for one of said rollers, means for feeding material to be weighed onto said belt in advance of said weighing platform, weighing platform actuated means for controlling said means for feeding said material, each of said rollers having a central cylindrical portion and end portions provided with circumferential grooves, a circumferential series of projections in each of said grooves, said belt having a row of openings adjacent each marginal edge thereof, said belt having a continuous smooth faced main body portion engaging said cylindrical portions of said rollers and said projections on said rollers engaging in said openings in said belt.

5. In a material weighing apparatus, a weighing platform and a material conveyor comprising a pair of spaced rollers, a slick surfaced, plastic film conveyor belt extending around said rollers and having a relaxed upper run extending across said weighing platform and driving means for one of said rollers, said belt having a row of reinforced openings adjacent a marginal edge thereof, said openings being uniformly spaced longitudinally of said belt and uniformly spaced projections on said rollers engaging in said openings to provide a positive driving connection between said belt and each of said rollers.

6. In a material weighing apparatus, a weighing platform having a flat top face of uniform width and a material conveyor comprising a pair of spaced rollers and a slick surfaced conveyor belt of non-metallic flexible material extending around said rollers, said belt having a main body portion at least as wide as said platform, said main body portion of said belt having continuous smooth, slick faces, said belt having a relaxed upper run extending across said flat top face of said weighing platform with said main body portion thereof in face to face slidable engagement with said flat top face of said platform and driving means for one of said rollers, said last mentioned roller having a central smooth surfaced main body portion of approximately the width of said weighing platform and circumferential rows of uniformly spaced projections on said roller adjacent each end thereof and the marginal portions of said belt at each side of said main body portion thereof having correspondingly uniformly spaced rows of openings therein receiving said projections to provide a positive driving connection between said belt and said last mentioned roller.

7. In a material weighing apparatus, a weighing platform having a flat top face of uniform width, said platform comprising thin flat top and bottom plates and a grid-like reinforcement between said plates and a material conveyor comprising a pair of spaced rollers and a thin, wide conveyor belt of non-metallic flexible, slick surfaced sheet material extending around said rollers, said belt having a main body portion at least as wide as said platform, said main body portion of said belt having continuous smooth faces, said belt having an upper run extending across said flat top face of said weighing platform with said main body portion thereof in face to face slidable engagement with said flat top face of said platform and driving means for one of said rollers, said last mentioned roller and the marginal portions of said belt at each side of said main body portion thereof having interengaging means thereon providing a positive driving connection between said belt and said last mentioned roller.

8. In a continuous weighing device, a pair of spaced conveyor rollers, a weighing platform mounted between said rollers, a weighing belt extending around said rollers and having the upper run thereof extending over said weighing platform, driving means for one of said rollers, means for feeding material to be weighed onto said belt in advance of said weighing platform, weighing platform actuated means for controlling said means for feeding said material, each of said rollers having a central cylindrical portion and end portions having portions depressed below the periphery of said central portion, projections mounted in said depressed portions, said projections extending in a circumferential series around each of said end portions, said belt having a row of openings adjacent each marginal edge thereof and having a continuous smooth surfaced main body portion engaging said cylindrical portions of said rollers and said projections on said rollers engaging in said openings in said belt.

9. In a material weighing apparatus, a weighing platform and a material conveyor comprising a pair of spaced rollers, a wide, thin conveyor belt extending around said rollers and having an upper run extending across said weighing platform and driving means for one of said rollers, said belt having a row of openings adjacent a marginal edge thereof, grommets reinforcing said openings, said openings being uniformly spaced longitudinally of said belt and uniformly spaced studs mounted in said rollers having projecting rounding heads thereon having surfaces convexly curved both longitudinally and transversely of said heads and engaging said grommets.

10. In a continuous weighing device, a pair of spaced conveyor rollers, a weighing platform mounted between said rollers, a weighing belt extending around said rollers and having the upper run thereof extending over said weighing platform, driving means for one of said rollers, means for feeding material to be weighed onto said belt in advance of said weighing platform, weighing platform actuated means for controlling said means for feeding said material, each of said rollers having a central cylindrical portion and end portions having portions depressed below the periphery of said central portion, a circumferential series of studs mounted in said depressed portions, said studs having projecting rounding heads thereon having surfaces convexly curved both longitudinally and transversely of said heads, said belt having a row of openings adjacent each marginal edge thereof and having a continuous smooth faced main body portion engaging said cylindrical portions of said rollers and said heads on said studs engaging in said openings in said belt.

11. In a material weighing apparatus, a weighing platform and a material conveyor comprising a pair of spaced rollers, a wide, thin conveyor belt extending around said rollers and having an upper run extending across said weighing platform and driving means for one of said rollers, said belt having a row of openings adjacent each of the marginal edges thereof uniformly spaced longitudinally of said belt, grommets reinforcing said openings, said grommets having tubular portions having convexly curved flaring bottom entrances and uniformly circumferentially spaced studs mounted in one of said rollers adjacent the opposite ends thereof having projecting rounding heads thereon having surfaces convexly curved both longitudinally and transversely of said heads and engaging in said grommets by entrance into said tubular portions from the bottom thereof.

12. In a continuous weighing device, a pair of spaced rollers, a thin, light weighing belt of non-metallic flexible sheet material extending around said rollers, a weighing platform comprising a flat upper plate, a lower plate and a stiffening grid between said upper and lower plates, said belt having a main body portion at least as wide as said weighing platform, said belt having a relaxed upper run extending across said upper plate of said weighing platform with said main body portion thereof in face to face sliding engagement with said flat upper plate, driving means for one of said rollers, and interengaging means on said roller and the marginal portions of said belt for positively driving said belt.

13. In a continuous weighing device, a frame, a pair of spaced rollers mounted on said frame, a weighing belt of non-metallic flexible sheet material extending around said rollers, a weighing platform having a flat top face, paired flexures of highly resilient steel connecting the opposite ends of said weighing platform with said frame, said belt having a main body portion at least as wide as said weighing platform, said belt having a relaxed upper run extending across said weighing platform with said main body portion thereof in face to face sliding engagement with said flat top face of said weighing platform, driving means for one of said rollers, and interengaging means on said roller and the marginal portions of said belt for positively driving said belt.

References Cited in the file of this patent

UNITED STATES PATENTS

| | | |
|---|---|---|
| 1,321,686 | Varden | Nov. 11, 1919 |
| 1,638,244 | Cooke | Aug. 9, 1927 |
| 2,088,334 | Merchen | July 27, 1937 |
| 2,276,383 | Francis | Mar. 17, 1942 |
| 2,550,788 | De Swart | May 1, 1951 |
| 2,639,025 | Schmitt | May 19, 1953 |
| 2,828,001 | Bornemann | Mar. 25, 1958 |
| 2,917,207 | Prowse | Dec. 15, 1959 |
| 3,110,419 | Atkins et al. | Nov. 12, 1963 |